United States Patent [19]

Martin et al.

[11] Patent Number: 4,683,102

[45] Date of Patent: Jul. 28, 1987

[54] DEVICE FOR OPERATING A CLUSTER OF NEUTRON ABSORBER ELEMENTS IN A PRESSURIZED WATER NUCLEAR REACTOR

[75] Inventors: Jean Martin, Chatillon; René Peletan, La Varenne Saint-Hilaire, both of France

[73] Assignee: Framatome & Cie., Courbevoie, France

[21] Appl. No.: 621,658

[22] Filed: Jun. 18, 1984

[30] Foreign Application Priority Data

Jun. 17, 1983 [FR] France ................... 83 10028

[51] Int. Cl.$^4$ .............................................. G21C 7/00
[52] U.S. Cl. .................... 376/209; 376/203; 376/230; 376/233
[58] Field of Search ............. 376/209, 230, 228, 233, 376/203, 232

[56] References Cited

U.S. PATENT DOCUMENTS 3,698,724 10/1972 Blachere et al. ............... 376/203
4,544,521 10/1985 Millot et al. .................... 376/209

FOREIGN PATENT DOCUMENTS

1310018 10/1962 France ................... 376/203
1377259 9/1964 France ................... 376/203
0118914 4/1977 Japan ..................... 376/203

Primary Examiner—Harvey E. Behrend
Attorney, Agent, or Firm—Pollock, Vande Sande & Priddy

[57] ABSTRACT

Device for operating a cluster of neutron absorber elements in a pressurized water nuclear reactor, comprising two coaxial control shafts (2, 3), the central shaft (3) being rigidly joined to the cluster of absorber elements. A widened part (22) of this shaft (3) forms a piston (22) which is fitted with segments (35). A pressure difference on either side of a segment (35) permits the clusters of absorber elements to be lifted by acting on the piston (22). The segment (35) is radially expandable and the leaktight sealing of the segment is initiated by entry of the piston (22) into the reduced diameter zone (10) of the shaft (2). The invention applies, in particular, to nuclear reactors with spectral shift employing clusters of fertile elements.

12 Claims, 20 Drawing Figures

DEVICE FOR OPERATING A CLUSTER OF NEUTRON ABSORBER ELEMENTS IN A PRESSURIZED WATER NUCLEAR REACTOR

FIELD OF THE INVENTION

The invention relates to a device for operating a cluster of neutron absorber elements in a pressurized water nuclear reactor with spectral shift control

BACKGROUND OF THE INVENTION

Pressurized water nuclear reactors with spectral shift control which have been described in U.S. patent application Ser. No. 531,786 filed Sept. 13, 1983 and U.S. Pat. No. 4,544,521 are known.

Such reactors permit a better use of the nuclear fuel by modifying the neutron energy spectrum in the course of the successive phases of the operating cycle of the reactor. During the first part of the operating cycle of the reactor, clusters of elements of neutron-absorbing material are introduced into the core to produce a hardening of the neutron spectrum, both by reducing the volume of moderator in the core and by absorbing low energy neutrons. In a second part of the operating cycle of the reactor, the clusters of absorber elements are withdrawn from the core of the reactor and the fissile material formed during the first phase is consumed. The elements of absorber material are preferably of a fertile material capable of being converted into fissile material under the effect of the neutron bombardment. This fertile material is most frequently uranium constraining a low proportion of uranium 235.

Nuclear reactors with spectral shift control are controlled, so far as their power is concerned, in the same was as conventional pressurized water nuclear reactors. This control of power is ensured by an assembly of control rods, each consisting of absorber clusters which are moved vertically inside the reactor core by means of driving mechanisms which usually consist of electromagnetically controlled ratchets. The core of the reactor consists of prismatic assemblies arranged vertically and side by side, each comprising an assembly of guide tubes into which can be introduced at a variable depth the absorber elements of the cluster forming the control rod. The control rods are associated only with a part of the reactor core assemblies and each of these assemblies receiving a control rod is associated with a mechanism for precise vertical movement of this control rod.

In contrast to the control rods, the absorber clusters for spectral shift control remain in a fixed position in the assemblies which receive them in the course of a phase of the operating cycle of the reactor, i.e., in a position of maximum insertion during the first phase of the cycle and in a position of complete withdrawal during the second phase of the cycle.

U.S. Pat. No. 4,544,521 discloses a control device which makes it possible to carry out both the movement of a control rod for the control of reactor power and the withdrawal of an absorber cluster for spectral shift control associated with the same assembly, at the end of the first phase of the operating cycle of the reactor.

In fact, it is preferable to associate the control rods and the clusters for spectral shift control with the same fuel assemblies which comprise a first assembly of guide tubes intended to receive the elements of the control rod and a second assembly of guide tubes intended to receive the absorber cluster for spectral shift control.

U.S. Pat. No. 4,544,521 describes a device comprising a first tubular control shaft to the lower part of which is fixed the control rod and a second control shaft arranged coaxially with the first inside the latter, to the lower part of which is fixed the absorber cluster for spectral shift control.

The first control shaft comprises, on its outer surface, grooves allowing it to be moved stepwise by a conventional ratchet device. This control shaft moves inside a vertical leaktight enclosure of a great height, fixed to the cover of the vessel and communicating with the inner volume of this vessel. The ratchet mechanisms are fixed to this enclosure. At the end of the upward movement, the first control shaft can move a few additional steps beyond its position corresponding to the maximum withdrawal of the control rod. This high overrun of the first control shaft allows the fingers for hooking the second control shaft to the first to be placed in an open position.

The second control shaft comprises a widened part equipped with sealing segments forming a piston inside the first control shaft whose inner surface forms the corresponding cylinder. The sealing segments associated with the piston are therefore of an outer diameter which is identical to the inner diameter of the first control shaft so as to produce a leaktight seal between the piston and the cylinder. An exhaust valve is arranged in the upper part of the leakproof enclosure, the opening of this valve producing a reduction in pressure in the upper part of the inner volume of the first control shaft above the piston of the second control shaft. The opening of this valve, at the end of the first phase of the operating cycle of the reactor, the first control shaft being in a high overrun position, makes it possible to withdraw the cluster of absorber elements for spectral shift control and to place it in a high position inside the first control shaft. In this position it is possible to effect the hooking of the second control shaft on the first by virtue of the pivoting fingers carried by the first control shaft.

During the second phase of the operating cycle of the reactor, the two control shafts are united and the absorber cluster for spectral shift control follows the movements of the control rod. In this second phase of the cycle, however, the control rods remain practically always in a withdrawn position.

Such a device, which is very simple and which does not require structural modifications of the reactor, presents nevertheless the disadvantage of retaining a sliding contact between the sealing segments of the piston formed by the second control shaft and the interior surface of the first control shaft at every movement of the control rod during the first phase of the operating cycle of the reactor. The absorber cluster for spectral shift control and the second control shaft are, in fact, stationary during this entire phase while the first shaft and the control rod are moved very frequently, mainly in a localized zone.

Although the piston of the second control shaft is used solely at the end of the first phase and for an extremely short period, the sealing segments of this piston risk being worn and deteriorated by the rubbing on the inner surface of the first control shaft.

Furthermore, during the upward movements of the first control shaft, the second shaft runs the risk of being dragged along since the sealing segments are in constant contact with the interior surface of this first control shaft.

SUMMARY OF THE INVENTION

The aim of the invention is therefore to propose a device for operating a cluster of neutron absorber elements in a pressurized water nuclear reactor with spectral shift control comprising fuel assemblies in a part of which, on the one hand, a first assembly of vertical guide tubes permits the controlled movement of the reactor control rods and, on the other hand, a second assembly of vertical guide tubes permits the introduction of clusters of neutron absorber elements which are either in a position of maximum insertion in the corresponding assembly or in a position of complete withdrawal, during successive operating phases of the reactor, each of the control rods being joined at its upper part, inside a leakproof enclosure communicating with the inner volume of the reactor vessel, to a first vertical control shaft of a tubular shape and each of the absorber clusters being joined at its upper part to a second control shaft mounted coaxially inside the corresponding first control shaft, the device for operating the absorber cluster comprising a piston formed by a widened part of the second control shaft movable in the internal cylindrical space of the first control shaft and capable of moving in a high withdrawal position of the absorber cluster, under the effect of a pressure reduction created in the internal space of the first control shaft, above the piston, to effect the hooking of the second control shaft to the first in a position of high overrun, this operating device making it possible to avoid a rubbing producing wear between the piston and the cylindrical space of the first control shaft during the movements of the control rod and also making it possible to overcome the risks of the second control shaft being dragged by the first during its upward movements, when the cluster of absorber elements is in a position of maximum insertion.

For this purpose, the internal cylindrical space of the first control shaft has a first zone with a first diameter over the greater part of its length and a second zone, connected to the first by a frustoconical part, with a second diameter which is substantially smaller than the diameter of the first zone, over a small part of its length corresponding to the low part of the first control shaft surrounding the piston of the second control shaft in its low position, when the first control shaft comes into a high overrun position, and the piston comprises at its periphery at least one annular sealing segment capable of radial expansion whose diameter in the unstressed state is substantially smaller than the diameter of the first zone of the cylindrical space and similar to the diameter of the second zone and whose radial expansion, when the internal space of the first control shaft is placed under reduced pressure and the piston moves upward from the second zone of this internal space, is sufficient for the sealing segment to come into sliding contact with the inner surface of the first control shaft in its first zone.

BRIEF DESCRIPTION OF THE DRAWINGS

In order that the invention may be more clearly understood, a description will now be given by way of non-limiting example, with reference to the attached drawings, of a device for operating a cluster of fertile elements in a nuclear reactor with spectral shift control, cooled by pressurized water.

FIG. 3a is a part-section view of a operating piston of a device according to the invention fitted with sealing segments according to a first embodiment, shown in position in the large diameter zone of the first control shaft.

FIG. 3b is as view which is identical to FIG. 3a, showing the piston in a position in the reduced diameter zone of the first control shaft.

FIG. 3c is a plan view of the sealing segment along A of FIG. 3a.

FIG. 5b is a plan view of the sealing segment along C of FIG. 5a.

DETAILED DESCRIPTION

Figure 1A:
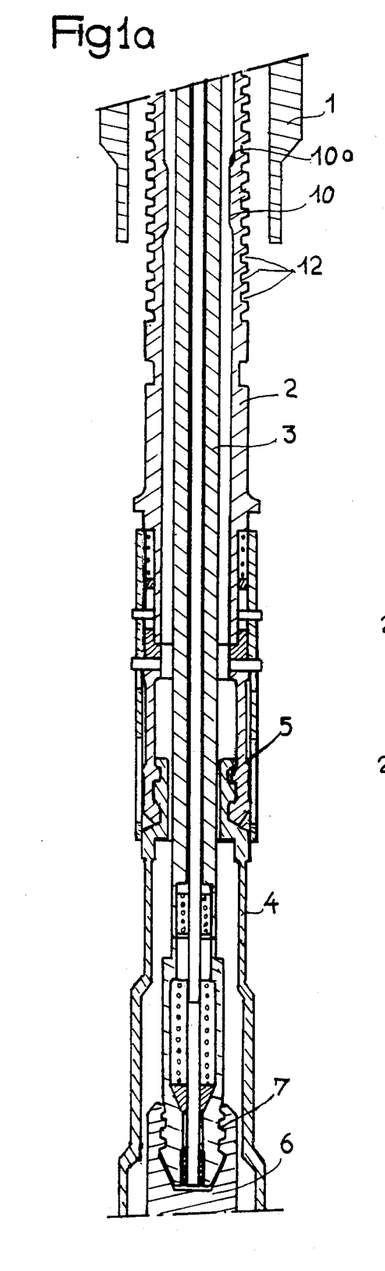
FIG. 1 is a view in cross-section through a vertical plane of symmetry of the lower part of the two control shafts of an operating device according to the invention.

FIG. 1a shows the lower part of the first control shaft 2 arranged inside a leakproof enclosure 1 fixed, integrally to the cover of the nuclear reactor vessel, (not shown), and communicating with the internal volume of this vessel.

Figure 1B:
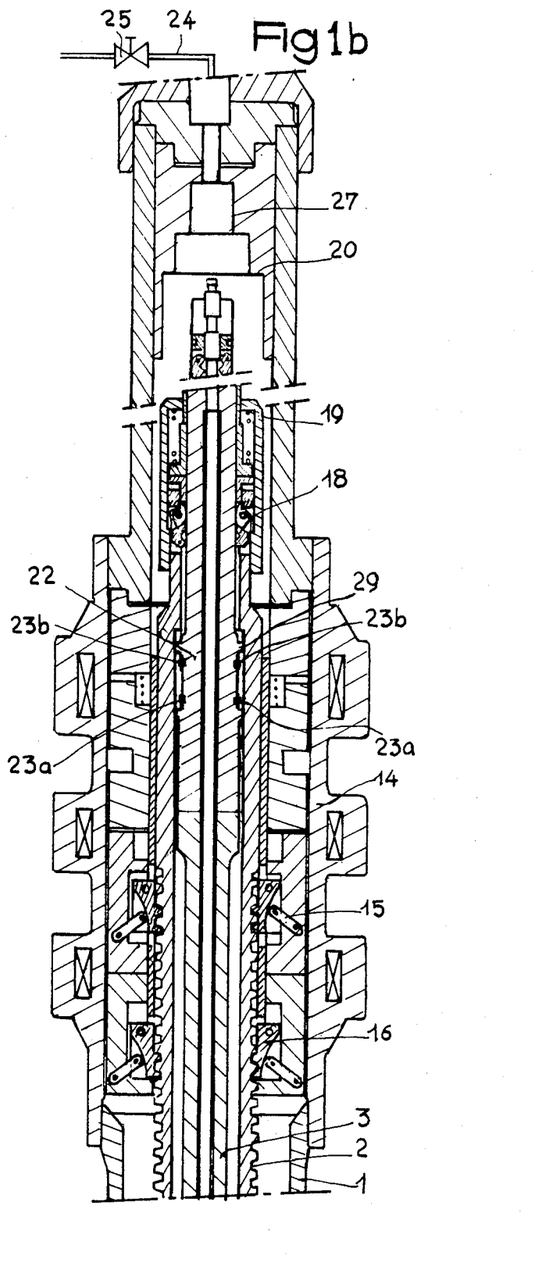
FIG. 1b is a view in cross-section through a vertical plane of symmetry of the upper part of the driving shafts and of the leakproof enclosure.

The second control shaft 3 is arranged inside the tubular control shaft 20 coaxially with the latter and with regard to the enclosure 1, as can be seen in FIGS. 1a and 1b.

The control shaft 2 is joined at its lower end to the pommel 4 of the control rod through the intermediary of a device 5, while the second control shaft 3 is joined to the pommel 6 of the cluster of fertile elements through the intermediary of a device 7. The fixing devices 5 and 7 have been described in U.S. Pat. No. 4,544,521.

The tubular control shaft 2 comprises a reduced diameter zone 10 of very short length relative to the overall length of the control shaft 2. This reduced diameter part 10 is separated from the part of the internal cylindrical space of the first control shaft which is situated above it by a frusto-conical surface 10a. This reduced diameter zone 10 has a length which is close to 15 cm while the control shaft 2 has a length greater than 4 meters. This zone 10 is situated in the lower part of the control shaft 2 whose outer surface is machined to produce successive annular grooves 12 spaced equally over this control shaft.

In a conventional manner, the leakproof enclosure 1 carries an electromagnetic unit 14 comprising three windings and two ratchet units 15 and 16 intended to cooperate by means of their teeth with the grooves of the first control shaft for moving the latter in the vertical direction.

In its upper part, the first control shaft 2 carries pivoting fingers 18 for hooking the second control shaft 3. A mantle 19 enables these pivoting fingers to be actuated for their opening when the control shaft 2 comes into a high overrun position inside the leakproof enclosure 1. The mantle 19 then comes to rest on a shoulder 20 in the upper part of this leakproof enclosure to be actuated and for the opening maneuver of the fingers 18.

The second control shaft 3 comprises a widened part 22 carrying sealing segments 23 and forming a piston for the withdrawal by upward movement of the cluster of fertile elements fixed to the lower part of the second control shaft 3.

The leakproof enclosure is joined at its upper part to a low-pressure circuit 24 comprising a control valve 25.

In FIGS. 1a and 1b, the control shafts 2 and 3 are shown in their low position, the second control shaft 3 remaining in this low position during the entire first phase of the operating cycle of the reactor. At the end of the first phase of the reactor cycle, all the shafts 2 joined to the control rods in the reactor are brought into high position in the corresponding leakproof enclosures 1. At the end of this upward movement of the control shaft 2, the mantle 19 comes to rest against the shoulder 20 and the upper part of the control shaft 2 above the mantle 19 engages in the upper channel 27 of the leakproof enclosure. In this position, the low-pressure circuit 24 communicates directly with the inner cylindrical space of the control shaft 2. The grooves in the control shaft 2 are designed so that it is still possible for the control shaft 2 to execute a slight upward overrun with an amplitude of a few steps. In the course of this high overrun of the control shaft 2, the mantle 19 actuates the fingers 18 in the opening direction. The position of the reduced diameter zone 10 of the control shaft 2 is chosen so that this reduced diameter zone comes into a position around the piston 22 of the control shaft 3 which is still in a low position, during the high overrun of the control shaft 2. The segments 23, which are radially expandable segments whose diameter in an unstressed state is close to the internal diameter of the zone 10 of the control shaft 2, then ensure an insulation between the part of the inner cylindrical space of the control shaft 2 situated above the piston 22 and the part of this inner cylindrical space situated below the piston 22.

The operating device is now ready for the lifting of the control shaft 3 and of the cluster of fertile elements. For this purpose, the valve 25 is opened, producing a significant pressure reduction in the channel 27 and in the inner cylindrical space of the control shaft 2 above the piston 22. This pressure reduction is not produced below the piston 22 because the segments 23 provide a seal or at least a considerable pressure drop in the inner cylindrical space of the control shaft 2.

The difference in pressure on either side of the piston 22 causes the lifting of the control shaft 3 inside the control shaft 2, the segments 23 having sufficient radial expansion to permit them to be applied against the inner surface of the cylindrical space of the control shaft 2 when they leave the reduced diameter zone 10 after the leaktight sealing has been initiated by introducing these joints into the reduced diameter zone.

We shall describe hereinbelow how these segments 23 can be produced to ensure sealing both in the reduced diameter zone and in the large diameter zone of the inner space of the control shaft 2.

The control shaft 3 rises inside the control shaft 2 until an end stop permits it to stop so that a groove machined in the control shaft 3 for engaging the fingers 18 is in a position of facing the fingers 18. A slight downward movement of the control shaft 2 then permits the fingers to close and to unite the shafts 2 and 3.

During the movements of the control rod which is united with the control shaft 2, when the second control shaft 3 is in a low position as shown in FIG. 1a and 1b, the piston 22 and the joints 23 remain in the region of the large dimaeter zone of the internal space of the control shaft 2. The clearance between the segments 23 and the inner surface of the control rod 2 makes it possible to effect movements of the control rod without any rubbing between the segments 23 and the inner surface of the control shaft 2. This clearance is of the same order of magnitude as the difference between the diameter of the large diameter part or running part of the inner space of the control shaft 2 and the inner diameter of the reduced diameter zone 10. This clearance of this difference in diameter can be between a few tenths of a millimeter and three millimeters, and is preferably between 5/10 of a millimeter and 3 mm.

The diameter of the segments 23 in an unstressed state can be very slightly greater than the diameter of the zone 10, the entry of these joints 23 into the zone 10 at the end of the upward movement of the control shaft 2 then taking place with a slight rubbing and a slight contraction of the segments 23 which then ensure a very good seal on either side of the piston 22.

These segments 23 can also have a diameter which is slightly smaller than the diameter of the zone 10, and the pressure difference on either side of the piston 22 will then be provided by the high pressure drop in the space between the segments 3 and the inner surface of the zone 10.

In all cases, the radial expansion of the joints by a pressure differences may have been initiated by the piston 22 crossing into the zone 10. The movements of the control rod will take place without wear of the segments 23 and without the control shaft 3 being dragged by the control shaft 2.

A wearing component 29 which protects the segments 23 against radial impacts is arranged at the periphery of the piston 22, above the upper segment 23b.

A description will now be given, with reference to FIGS. 2 to 7, of radial expansion joints which can be employed to ensure the leaktight sealing of a piston of an operating device according to the invention.

Figure 2A:
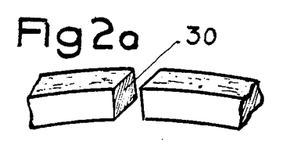
FIGS. 2a, 2b and 2c are views in perspective of the junction zones of the radially expandable sealing segments according to three conventional embodiments.
Figure 2B:
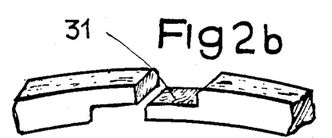
Figure 2C:
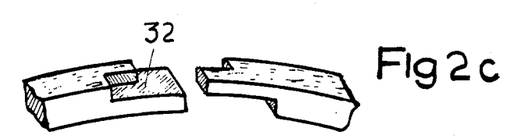

FIGS. 2a, 2b and 2c show three types of section produced in a conventional manner on radial expansion segments consisting of a ring with a square or rectangular cross-section, which is not closed and has some elasticity. When the segment is in an unstressed state, the two ends of the section are not in contact.

A segment comprising a single ring having a section 30 with a straight edge as shown in FIG. 2a produces considerable leakage. The section 31 shown in FIG. 2b which has an overlap produces a smaller leakage, and that shown in FIG. 2c produces a very low leakage but the production of such joints 32 is much more difficult.

The joints of the kind shown in FIGS. 2a, 2b and 2c can be employed to form radial expansion joints 23 associated with a piston 22 of an operating device according to the invention.

Figures 3A, 3B, 3C:
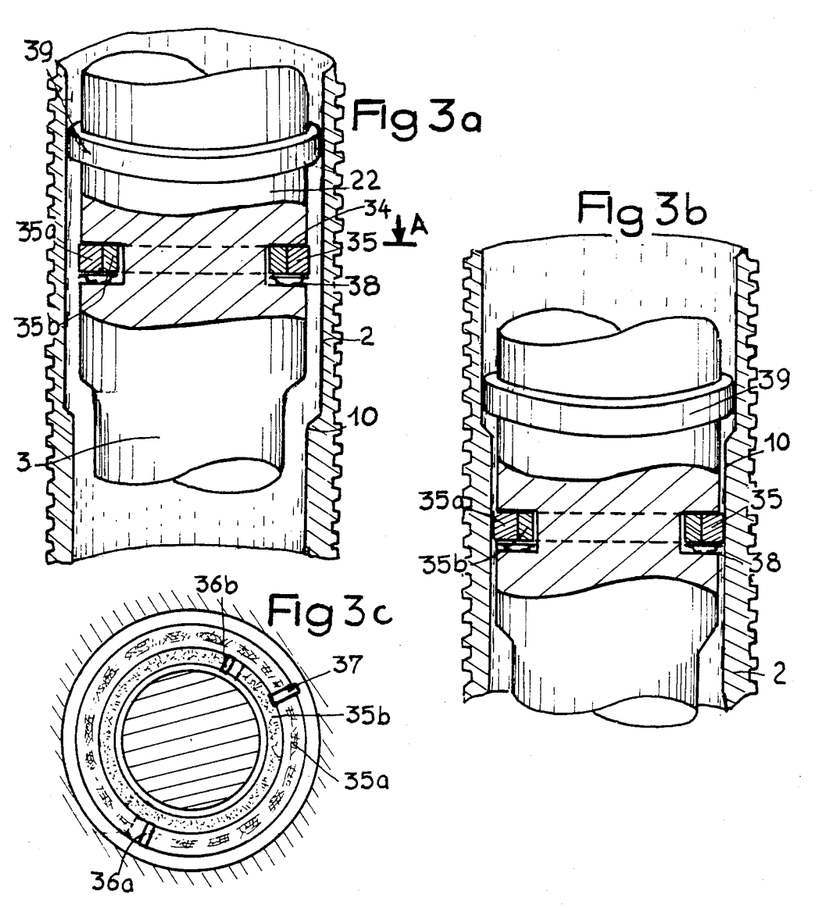

FIGS. 3a, 3b and 3c show an embodiment of a piston 22 according to the invention, this piston comprising an annular groove 34 in which is inserted a complex segment 35 consisting of an assembly of two segments 35a and 35b of the type shown in FIG. 2b, comprising sections 36a and 36b with an overlap which are arranged at 180° from each other as shown in FIG. 3c, the two segments 35a and 35b being arranged coaxially and facing each other. The outer diameter of the segment 35b in an unstressed state is substantially equal to the inner diameter of the segment 35a in an unstressed state.

A pin 37 permits the two segments 35 to be held in a constant relative angular position. A spring 38 is arranged between the lower surface of the annular groove 34 and the lower surface of the segment 35 so as to apply this segment 35 against the upper surface of the groove 34.

It may be noted that, when the piston 22 is in position inside the reduced diameter part 10 of the shaft 2, as shown in FIG. 3b, the segments 35 are in contact with the internal surface of this zone 10, their diameter in an unstressed state being slightly greater than the internal diameter of the zone 10. If a pressure reduction is applied above the piston 22 in its position 3b, the pressure difference will be applied both to the lower surface of the segment 35 and to the internal cylindrical surface of this joint so that, on the one hand, the segment 35 is applied against the upper surface of the annular groove 34 and, on the other hand, this segment 35 undergoes a radial expansion which continues during the rise of the piston 22 into the large diameter zone, through separation of the lips of the sections 36a and 36b of the joints 35, until the time when the outer cylindrical surface of the segment 35 comes into contact with the inner surface of the control shaft 2. The arrangement of the two sections 36 at 180° makes it possible to limit considerably the leakage between the interior and the exterior of the segment 35.

The piston 22 also comprises, above the segments 35, a protection ring 39 with a diameter between the outer diameter of the segments 35 and the diameter of the inner space of the control shaft outside the zone 10. This ring 39 makes it possible to avoid any contact between the segment 35 and the inner surface of the control shaft 2 during the movements of this shaft in operating the control rods, a slight axial imbalance being liable to occur during these movements. In this event it is the protection ring 39 which comes into contact with the inner surface of the control shaft 2 and which allows the relative recentering of the control shafts 2 and 3, without contact with the segments 35.

The spring 38 holding the segments 35 against the upper surface of the annular groove 34 is not essential because, when the piston 22 is introduced into the reduced diameter zone 10 by the relative movement of the control shafts 2 and 3, these segments are moved by sliding against the upper part of the groove 34, if their diameter in an unstressed state is slightly greater than the diameter of the zone 10. If, on the other hand, their diameter were slightly smaller than the diameter of the zone 10, the spring 38 would be essential to avoid a leakage between the upper surface of the segments 35 and the upper surface of the groove 34.

Figures 4A, 4B, 4C:
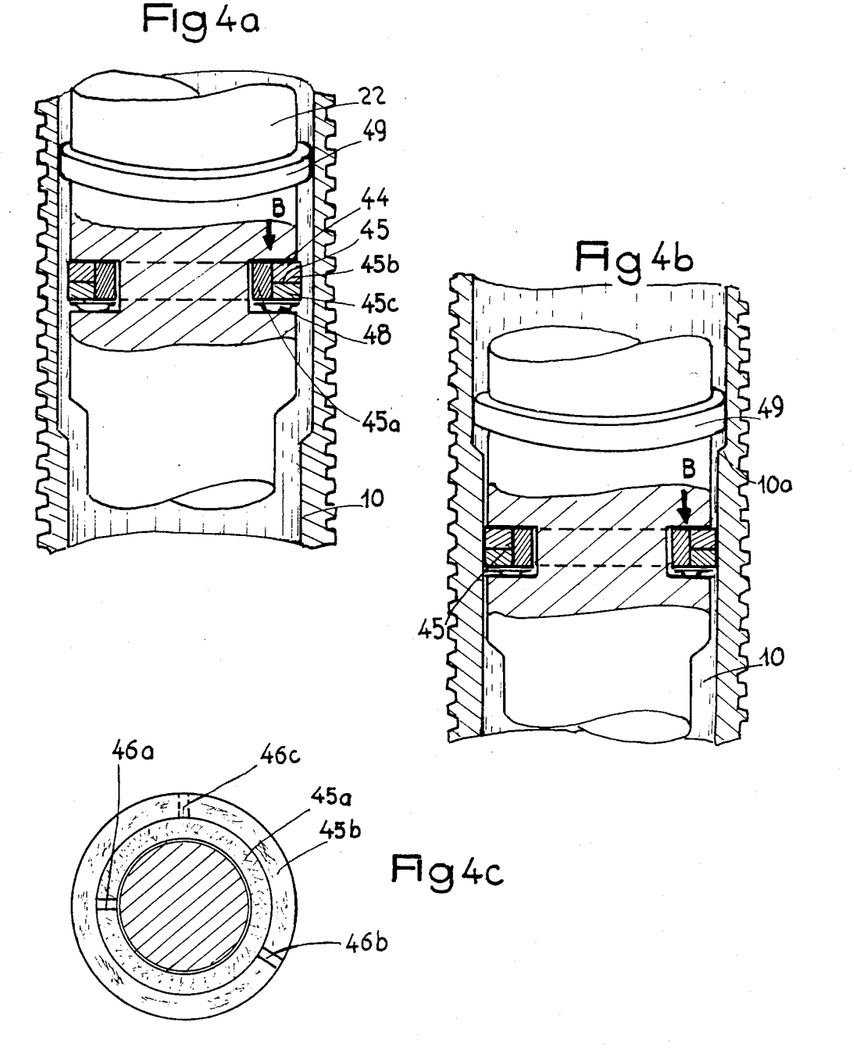
FIG. 4a is a part-section view of a piston comprising a sealing segment according to a second embodiment and shown in position in the large diameter part of the first control shaft.
FIG. 4b is a view in part-section of the sealing piston shown in FIG. 4a in position in the reduced diameter part of the first operating shaft.
FIG. 4c is a plan view along B of the sealing segment of the piston shown in FIGS. 4a and 4b.

FIGS. 4a, 4b and 4c show a second type of sealing segment of a piston 22 which is practically identical to the piston shown in FIGS. 3.

The sealing segment 45 consists of three elementary segments 45a, 45b and 45c which are all segments having a straight section such as shown in FIG. 2a.

Segment 45a has an outer diameter in an unstressed state which is substantially identical to the inner diameter of the segments 45b and 45c which are identical and are arranged above one another. The height of the segment 45a is equal to twice the height of the segments 45b and 45c.

As can be seen in FIG. 4c, the straight sections 46a, 46b and 46c of the segments 45a, 45b and 45c respectively are arranged at 120° from each other, assuming a rotation around the axis of the joint 45.

As in the case of the first embodiment described with reference to FIG. 3, a spring 48 enables the segment 45 to be held against the upper surface of the groove 44 provided in the piston 22, and a protection ring 49 is arranged above the joint 45.

Figure 5A:
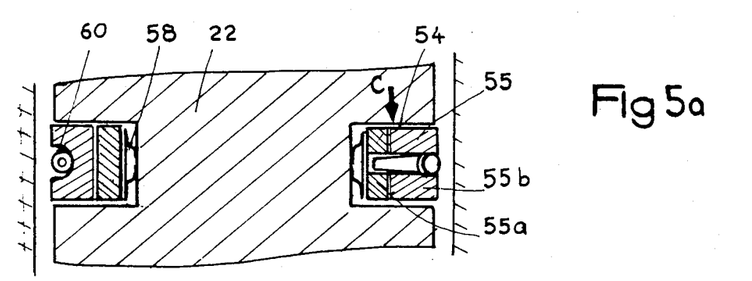
FIG. 5a is a view in cross-section through a vertical plane of a part of a piston of a operating device according to the invention, comprising a sealing segment according to a third embodiment.
Figure 5B:
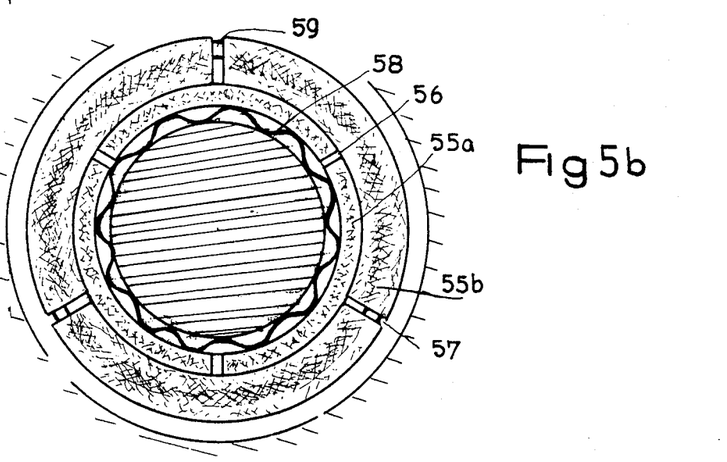

FIG. 5a and 5b show a sealing segment 55 arranged inside an annular groove 54 machined in a piston 22 of an operating device according to the invention.

The segment 55 consists of an inner radial expansion segment 55a and an outer segment 55b, also radially expandable.

The inner segment 55a consists of three toric parts joined along sections 56 with an overlap, as shown in FIG. 2b.

The outer segment 55b also consists of three toric parts with a rectangular cross-section joined along sections 57 with an overlap, as shown in FIG. 2b.

The three sections 56 and the three sections 57 which are arranged at 120° on the segments 55a and 55b respectively are themselves arranged at 60° from each other, assuming a rotation around the axis of the joint.

An inner cylindrical wave spring 58 makes it possible to apply outward forces against the three parts of the inner segment 55a, while an outer spring 59 makes it possible to apply inward forces to the three parts of the segment 55b.

The spring 59 is arranged inside a groove 60 provided in the outer cylindrical surface of the outer joint 55b.

When the piston 22 is introduced into the reduced diameter zone 10, the inner spring 58 is compressed and the outer spring, which is slightly prestressed, relaxes. When a pressure difference is produced on either side of the piston 22 and when the shaft 3 rises, the inner spring 58 relaxes and the outer spring expands.

The force exerted outwards by the inner spring 58 (curve A) and the force exerted inwards by the outer spring 59 (curve B) are shown as a function of the radial deformation R of the segment 55. The curve C corresponds to the resultant force exerted in the sealing segment 55.

The point I relates to the segment 55 in its state of maximum contraction inside the zone 10 of the control shaft 2, the point E to the normal state of the spring without an external stress, and the point F to the state of maximum radial expansion of the segment under the effect of the pressure, when this segment is in the widened diameter zone of the control shaft 2.

The springs 58 and 59 are chosen so that their characteristic curves intersect at N whose abscissa corresponds to R of the sealing segment in the normal state. The segment is thus in a state of zero stress.

The balancing of the two springs thus permits the diameter of the segment in the normal state to be adjusted with a high degree of accuracy, while the choices of the characteristics of the two springs permit highly accurate adjustment of the radial expansion of the segment as a function of the difference in pressure on either side of this segment.

Figure 5C:
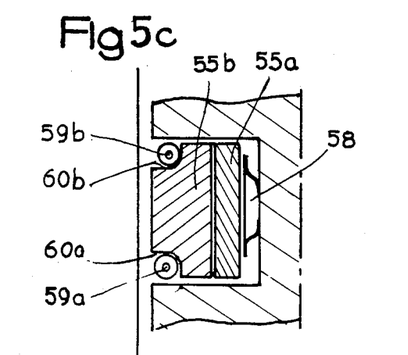
FIG. 5c is a partial half-section of a piston of a operating device according to the invention comprising a sealing segment according to an alternative version of the third embodiment.
Figure 5D:
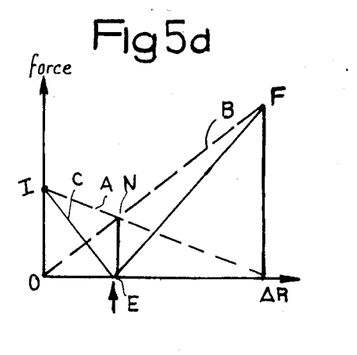
FIG. 5d is a graph showing the distribution of forces in the components of the sealing segment shown in FIGS. 5a and 5b, as a function of the radial distortion of the sealing segment.

FIG. 5c shows an alternative form of the segment 55 shown in FIGS. 5a and 5b where the outer toric parts 55b of the segment 55 comprise two grooves 60a and 60b in their lower and higher parts, respectively, in which are arranged two outer springs 59a and 59b, respectively, retaining these parts of the torus forming the outer segment 55b.

Figures 6A, 6B, 7A, 7B:
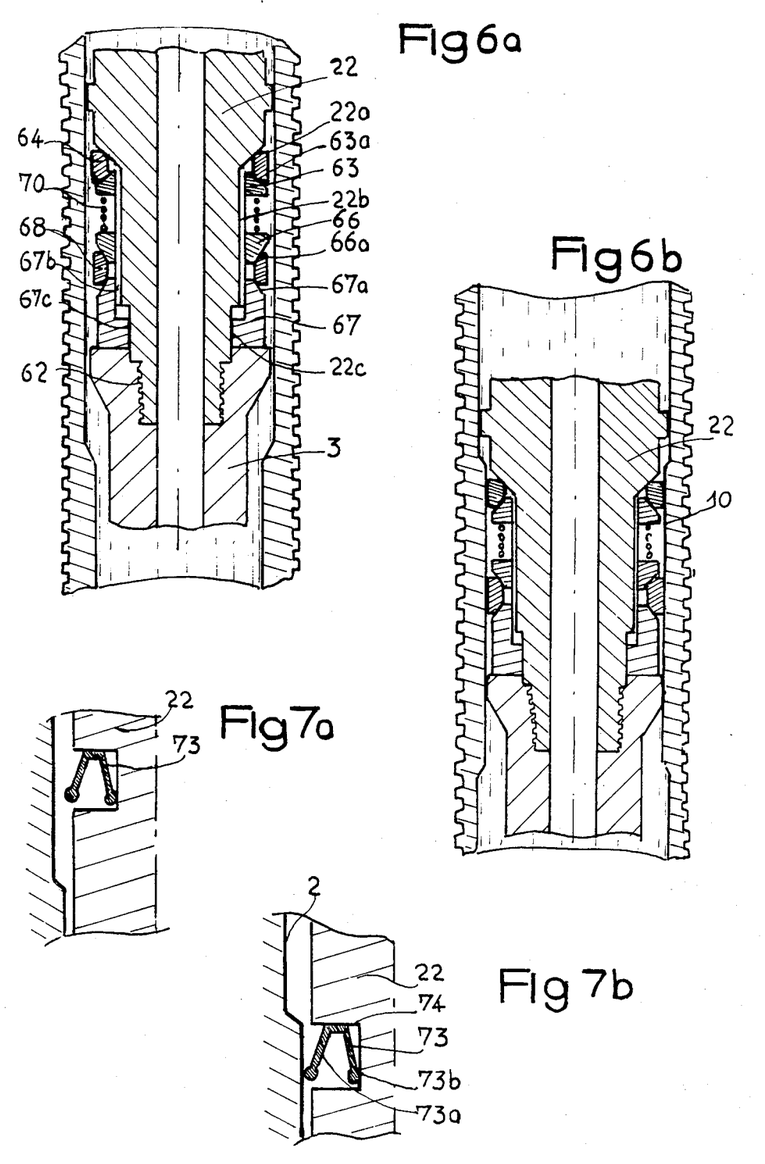
FIG. 6a is a view in part-section of a piston of a operating device according to the invention comprising sealing segments according to a fourth embodiment shown in position in the large diameter part of the first control shaft.
FIG. 6b is a view in cross-section of the piston shown in FIG. 6a in position in the reduced diameter part of the first control shaft.
FIG. 7a is a half-view in cross-section through a vertical plane of a part of a piston of a operating device according to the invention, comprising a sealing segment according to a fifth embodiment, in position in the large diameter part of the first control shaft.
FIG. 7b is a half-section view of the piston shown in FIG. 7a in position in the reduced diameter part of the first control shaft.

FIGS. 6a and 6b show an alternative embodiment of the piston 22 which is assembled by screwing a threaded part 62 into a widened and internally tapped part of the shaft 3. The body of the piston 22 comprises a frusto-conical bearing 22a separating an upper large diameter part of the piston 22 from a lower cylindrical part 22b with a smaller diameter. An actuating ring 63 comprising a frusto-conical bearing 63a is fitted onto the lower part 22b of the piston 22 with a sliding friction. A toric segment 64 is inserted between the frusto-conical surfaces 22a and 63a, this segment 64 comprising on its inner surface two corresponding frusto-conical bearings in contact with the frusto-conical surfaces 22a and 63a.

On the lower part 22b of the cylinder 22 there is also fitted with a sliding friction an actuating ring 66 comprising a frusto-conical surface 66a on its outer surface. A spring 70 enables some separation to be maintained between the rings 63 and 66.

A segment 68 which is practically identical to the segment 64 bears with one of its frusto-conical bearing surfaces against the surface 66a, and with its other frusto-conical bearing surface against the bearing surface 67a of an actuating ring 67 which is also fitted over the lower cylindrical part 22b of the piston 22. This ring 67 comprises a first bore 67b and a second bore 67c whose diameters are different and correspond to the diameters of the two successive zones 22b and 22c of the piston 22. The machining of the surfaces 67b and 67c and of the piston 22 in the zones 22b and 22c is such that the ring 67 can slide on the piston and that a good seal is ensured between the bore 67c and the part 22c of the piston 22. Between the bore 67b, the bores of the rings 63 and 66, on the one hand, and the part 22b of the piston, on the other hand, the fluid filling the enclosure 1 can nevertheless circulate and equilibrate in pressure. For this purpose, longitudinal grooves can be machined in the part 22b of the piston 22.

The segments 64 and 68 are radial expansion segments whose diameter in the unstressed state is slightly greater than the internal diameter of the zone 10 of the control shaft 2.

When the piston 22 is moved to coincide with the zone 10, as shown in FIG. 6b, the bringing of the outer surfaces of the segments 64 and 68 in contact with the inner surface of the zone 10 produces a slight movement of the actuating rings 63 and 66 relative to the ring 67.

A pressure difference is produced on either side of the segments 64 and 68, and when the piston 22 moves upward, this pressure difference acts on a circular cross-section included between the bore 67c and the diameter of the zone 10 to produce, through the intermediary of the frusto-conical bearing 67a, the expansion of the segment 68, the upward movement of the actuating ring 66 and of the actuating ring 63 through the intermediary of the spring 70, which causes the expansion of the segment 64.

This solution has the advantage of increasing the force which is exerted on the piston during its rise by increasing the cross-section to which pressure is applied by virtue of using an actuating ring with a frusto-conical bearing. There is also a possibility of an additional control by adjusting the angle of the frusto-conical part for actuating the ring.

FIGS. 7a and 7b show a different and highly simplified embodiment of a sealing segment of a piston 22 employed in an operating device according to the invention.

This sealing segment consists of a profiled elastic joint arranged in a groove 74 whose U-shaped or V-shaped meridian cross-section 73 has two branches 73a and 73b whose separation can vary through elastic deformation of the joint. The open part of the joint is directed towards the zone where the pressure is higher when the absorber cluster is operated, namely, downwards.

This elastic deformation can be obtained, for example, when the piston 22 enters the reduced diameter zone 10, as can be seen in FIG. 7b. The branches 73a and 73b are then brought toward each other if the external diameter of the segment is slightly greater than the internal diameter of the zone 10.

When a pressure difference is established on either side of the segment 73, the forces acting on the interior of this segment produce an increased separation of the branches 73a and 73b, with the result that the branch 73a can come into contact with the inner surface of the large diameter part of the control shaft 2, when the piston 22 rises inside the shaft 2 under the effect of the pressure difference.

The segments employed in the device according to the invention can be made of various materials, for example carbon, graphite, a wear-resistant alloy of cobalt or an alloy with a high nickel content, cast iron with chromized segments or having undergone a hard chromium plating or of an elastic steel which has been chromized or has undergone a process of hard chromium plating or chemical nickel plating.

The main advantages of the invention, as shown in the description given above, are to allow placing the sealing segments of the activating piston of the second control shaft in contact with the inner surface of the first control shaft only at the time when the operating device for the lifting of the cluster of absorbing material is brought into action. In particular, untimely wear of these sealing segments, and risks of the second control shaft rising in the first, during the movement of the reactor control rods, are avoided. The initiation of the leaktightness of the segments is produced automatically, since the relative positions of the first and of the second control shafts are perfectly determined at the time when the rise of the absorber clusters is commanded. The position of the high overrun of the first control shaft is, in fact, perfectly determined, as well as the low position of the second control shaft, when the absorber clusters are completely inserted. The position of the actuating piston and of the sealing segments in the reduced diameter zone of the first control shaft can thus be obtained in a completely reliable manner.

The invention is not limited to the embodiments which have been described but, on the contrary, comprises all the alternative forms.

Thus, the actuating pistons which have been described usually comprise only one sealing segment, but it is possible to associate several sealing segments arranged above each other. For example, two sealing segments can be employed, permitting a good centering of the piston in the internal cylindrical space of the first control shaft.

It is also possible to conceive of other shapes of radial expansion segments than those which have been described.

It is possible to employ a reduced diameter zone occupying the whole low part of the first control shaft or, on the contrary, a zone occupying a length which is only very slightly greater than the length of the actuating piston (10 to 15 cm).

Finally, the operating device according to the invention is applicable in all cases where a reactor with spectral shift control comprises absorber clusters or control rods introduced into the same assemblies.

We claim:

1. In a spectral shift pressurized water reactor comprising:
   (a) a vessel,
   (b) a core comprising a plurality of nuclear fuel assemblies, each containing a plurality of first vertical guide tubes and a plurality of second vertical guide tubes,
   (c) a plurality of sets of control rods for controlling the power of the reactor having control rods movable within and along respective ones of the first guide tubes between a predetermined lower position and a predetermined upper position,
   (d) a plurality of clusters of spectral shift elements for changing the neutron energy spectrum of the reactor, each of said cluster being associated to a set of control rods, having elements movable within and along respective ones of the second guide tubes of the corresponding assembly of said set of control rods and being arranged to be maintained in one of two fixed positions including a low position of maximum insertion of the elements in the core and a high position of complete withdrawal of the elements from said core,
   operating means for operating said set of control rods and said clusters of spectral shift elements comprising:
   first operating means for operating sets of control rods up and down comprising a plurality of first vertical control shafts movable vertically between a second predetermined lower position and a second predetermined upper position and arranged to go further when forced to a higher overtopped position situated above said second predetermined upper position, each of said first vertical control shafts having a cylindrical tubular shape having a bottom end connected respectively to a corresponding set of control rods and having over the greatest portion of its length a part of a first internal diameter and over a small portion of its length a part of a second internal diameter, said second internal diameter being substantially smaller than said first internal diameter and being situated near the bottom end of said first shaft,
   second operating means for operating clusters of spectral shift elements comprising a plurality of second vertical control shafts each respectively mounted coaxially inside the corresponding first shaft of the associated set of control rods, respectively connected to each cluster and movable in the internal cylindrical space of corresponding first shaft, each of said second shafts having a widened cylindrical part along a small portion of its length, said small portion constituting a piston situated near the upper part of the said second shaft and coming into position around the internal part of substantially smaller diameter of the corresponding first shaft when said first shaft has raised to is higher overtopped position,
   said piston comprising at its periphery at least one solid joint, radially expandable to a certain extent under a predetermined pressure and which diameter in rest condition is substantially smaller than the first internal diameter of the first control shaft and substantially similar to the second internal diameter of said first control shaft and when sollicited by pressure is similar to said first internal diameter,
   said operating means further comprising pressure reduction means arranged to be connected to the internal cylindrical space of each of the first control shafts when said first shaft has raised to its higher overtopped position,
   and capable of moving in the high position of complete withdrawal of the elements of the cluster the corresponding second control shaft connected to said cluster of spectral shift elements under the effect of a predetermined pressure reduction created in the internal space of the first control shaft above the piston.

2. The combination according to claim 1 wherein the piston has a part comprising three sections, a top section in a frusto-conical shape, an upper section with a first external diameter and a lower section with a second external diameter smaller than said first external diameter, said operating device further comprising:
   a first actuating ring arranged to slide around said piston and having an upper part and two bores, a first bore with a first internal diameter and a second bore with a second internal diameter, said bores respectively corresponding to said sections and being arranged such that the second bore is in fluidtight contact with the lower section, the second internal diameter of said second bore being smaller than the first external diameter of the upper section and the first internal diameter of the first bore is arranged to fit with said upper section in a non fluidtight manner, said actuating ring further comprising a first conical part arranged to support the full solid expandable joint,
   a second actuating ring mounted to slide around the upper section of said part of the piston in a non fluidtight manner comprising a second frusto-conical part facing the first frusto-conical part of the first actuating ring and arranged to seat against said expandable joint, a cylindrical spring having a third internal diameter bigger than the second external diameter of the upper section of the piston and seated on said second frusto-conical part, a third actuating ring mounted to slide around the upper section of said part of the piston in a non fluidtight manner, arranged to seat on said cylindrical spring and comprising a third frusto-conical part facing the opposite side of the spring, a second solid radially expandable joint seating on said third frusto-conical part on one side and applied on the top section in frusto-conical shape of the piston on the other.

3. The combination according to claim 1, wherein the solid radially expandable joint consists of at least one ring, with a rectangular cross-section, said joint being interrupted on a part of its length.

4. The combination according to claim 3, wherein the solid radially expandable joint consists of an assembly of two rings, each of said rings being interrupted with a cut on part of the length of said rings, said cut of one of the rings being substantially disposed on the diametrally opposed side of the cut of the other ring.

5. The combination according to claim 3, wherein the solid radially expandable joint consists of three rings arranged coaxially, respectively interrupted with a cut on a part of their length, two of the rings being superposed and the third ring being arranged inside of said superposed rings over the entire height of said superposed rings, the three cuts being respectively arranged at approximatively 120° from each other.

6. The combination according to claim 4, wherein the solid radially expandable joint is arranged inside a groove having a lower face, machined in the piston and coaxial with this piston and wherein a spring is inserted between the lower face of said groove and a lower face of the joint.

7. The combination according to claim 4, wherein the solid radially expandable joint consists of two rings, an inner ring and an outer ring, said inner ring being arranged coaxially inside said outer ring, each of said rings consisting in at least three identical annular parts separated by cuts of a small length and held jointly by an assembly of two annular springs, one of said springs being arranged inside the inner ring and applying forces directed toward the outside of said inner ring, and the other spring being arranged against the outer surface of the outer ring and applying forces directed toward the inside of said outer ring, the cuts of the inner ring and the cuts of the outer ring being arranged at constant angular distances.

8. The combination according to claim 1, wherein the solid radially expandable joint consists of a profiled toric ring whose meridian cross-section has a U-shape or a V-shape having two elastic branches capable of separating or approaching each other under the effect of external stresses.

9. The combination according to claim 1, wherein the solid radially expandable joint is of a material belonging to the following group: carbon, graphite, cobalt alloy, nickel alloy, chromized segment cast iron, hard-chromium plated segment cast iron, chromized elastic steel, hard chromium plated segment elastic steel and chemically nickel plated elastic steel.

10. The combination according to claim 1, wherein the piston comprises, at its peripherical part, a stiff projecting protection ring whose outer diameter is greater than the outer diameter of the joint in the unstressed state and smaller than the diameter of the first zone of the inner space of the first control shaft.

11. The combination according to claim 1, wherein the second zone of the inner cylindrical space of the first control shaft has a diameter which is smaller by between five tenths of a millimeter and three millimeters than the inner diameter of the first zone of the internal space of said first control shaft.

12. The combination according to claim 1, wherein the second zone of the inner cylindrical space of the first control shaft is from ten to fifteen centimeters in length.

* * * * *